United States Patent
Wang

(10) Patent No.: US 7,129,604 B1
(45) Date of Patent: Oct. 31, 2006

(54) AIR COOLED TYPE GENERATOR THAT IS MOUNTED IN EASIER AND QUICKER MANNER

(76) Inventor: Wen-Chang Wang, 666, Sec. 1, Chung Cheng Rd., Jen Te Hsiang, Tainan-Hsien (TW)

(*) Notice: Subject to any disclaimer, the term of this patent is extended or adjusted under 35 U.S.C. 154(b) by 0 days.

(21) Appl. No.: 11/325,200

(22) Filed: Jan. 4, 2006

(51) Int. Cl.
*H02K 9/02* (2006.01)

(52) U.S. Cl. ............... 310/63; 290/1 A; 290/1 B; 310/52; 310/58; 310/59; 310/62

(58) Field of Classification Search ............ 310/52, 310/58, 59, 62, 63; 290/1 A, 1 B
See application file for complete search history.

(56) References Cited

U.S. PATENT DOCUMENTS

| | | | |
|---|---|---|---|
| 3,373,930 A * | 3/1968 | Rom ................. | 416/240 |
| 4,629,031 A * | 12/1986 | Kato et al. ............ | 181/204 |
| 4,647,835 A * | 3/1987 | Fujikawa et al. ....... | 322/1 |
| 4,779,905 A * | 10/1988 | Ito et al. ............. | 290/1 B |
| 5,144,175 A * | 9/1992 | Craggs ............... | 310/63 |
| 6,435,828 B1 * | 8/2002 | Bostwick ............. | 416/175 |
| 6,586,853 B1 * | 7/2003 | Ishida et al. ........... | 310/62 |
| 6,784,574 B1 * | 8/2004 | Turner et al. .......... | 310/58 |
| 7,023,101 B1 * | 4/2006 | Wang ................ | 290/1 A |
| 2005/0040714 A1 * | 2/2005 | Buening et al. ........ | 310/62 |
| 2005/0212299 A1 * | 9/2005 | Wang ................ | 290/1 A |

FOREIGN PATENT DOCUMENTS

| JP | 54095847 A | * | 7/1979 |
|---|---|---|---|
| JP | 60212613 A | * | 10/1985 |
| JP | 02155447 A | * | 6/1990 |
| JP | 2000324776 A | * | 11/2000 |
| JP | 2001295660 A | * | 10/2001 |
| JP | 2003120292 A | * | 4/2003 |
| JP | 2004173343 A | * | 6/2004 |

* cited by examiner

Primary Examiner—Darren Schuberg
Assistant Examiner—Ondria Garner
(74) Attorney, Agent, or Firm—Alan D. Kamrath; Nikolai & Mersereau, P.A.

(57) ABSTRACT

An air cooled type generator includes a housing, an engine, a cooling fan mounted in the engine, a generator body having a first side juxtaposed to the engine, and a cooling fan rotatably mounted on an opened second side of the generator body and including a plurality of blades each having an inner side formed with a first wing and an outer side formed with a second wing. Thus, the first wing and the second wing of each of the blades co-operate to carry the hot air away from the generator body rapidly, thereby enhancing the heat dissipation effect of the cooling fan. In addition, the generator only needs to provide two cooling fans to achieve the heat dissipation effect, so that the generator has a simplified construction and a smaller volume and is assembled easily and conveniently.

11 Claims, 4 Drawing Sheets

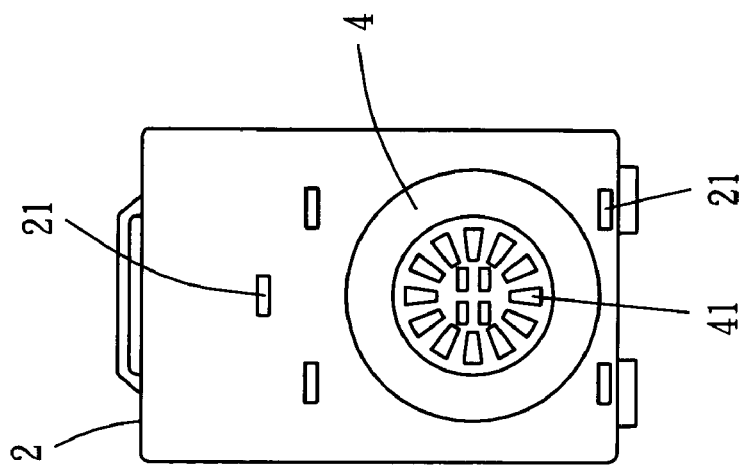
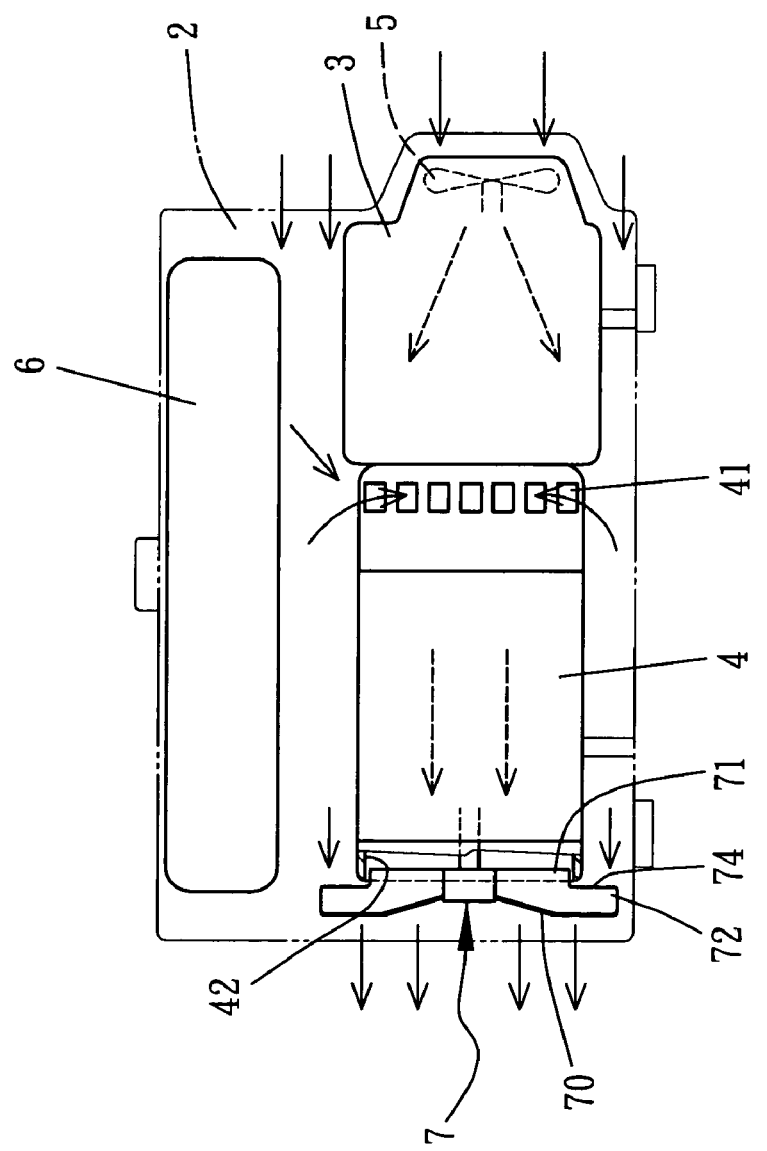
FIG. 2
FIG. 1

AIR COOLED TYPE GENERATOR THAT IS MOUNTED IN EASIER AND QUICKER MANNER

BACKGROUND OF THE INVENTION

1. Field of the Invention

The present invention relates to a generator and, more particularly, to an air cooled type generator.

2. Description of the Related Art

A conventional air cooled type generator in accordance with the prior art shown in FIGS. 4 and 5 comprises a housing 11, an engine 12 mounted in the housing 11, a first smaller fan 14 mounted in the engine 12, a first larger fan 18 mounted outside of the engine 12, a generator body 13 mounted in the housing 11 and juxtaposed to the engine 12, a second smaller fan 15 mounted in the generator body 13, a second larger fan 19 mounted outside of the generator body 13, a fuel tank 16 mounted in the housing 11, and an insulating layer mounted around the fuel tank 16.

SUMMARY OF THE INVENTION

In accordance with the present invention, there is provided a generator, comprising a housing, an engine mounted in the housing, a generator body mounted in the housing and having a first side juxtaposed to the engine, and a cooling fan rotatably mounted on an opened second side of the generator body and including a plurality of blades each having an inner side formed with a first wing located adjacent to the second side of the generator body and an outer side formed with a second wing spaced from the second side of the generator body.

The primary objective of the present invention is to provide a generator that is mounted in an easier and quicker manner.

Another objective of the present invention is to provide a generator, wherein the first wing and the second wing of each of the blades of the cooling fan co-operate to carry the hot air away from the generator body rapidly, thereby enhancing the heat dissipation effect of the cooling fan.

A further objective of the present invention is to provide a generator, wherein the generator only needs to provide two cooling fans to achieve the heat dissipation effect, so that the generator has a simplified construction, thereby decreasing costs of fabrication.

A further objective of the present invention is to provide a generator, wherein the generator only has two cooling fans, so that the generator has a smaller volume, thereby facilitating storage, packaging and transportation of the generator.

A further objective of the present invention is to provide a generator, wherein the generator only has two cooling fans, so that the generator is assembled easily and conveniently, thereby facilitating a user mounting the generator.

Further benefits and advantages of the present invention will become apparent after a careful reading of the detailed description with appropriate reference to the accompanying drawings.

BRIEF DESCRIPTION OF THE DRAWINGS

FIG. 1 is a front plan view of a generator in accordance with the preferred embodiment of the present invention.

FIG. 2 is a side plan view of the generator in accordance with the preferred embodiment of the present invention.

DETAILED DESCRIPTION OF THE INVENTION

Figure 3:
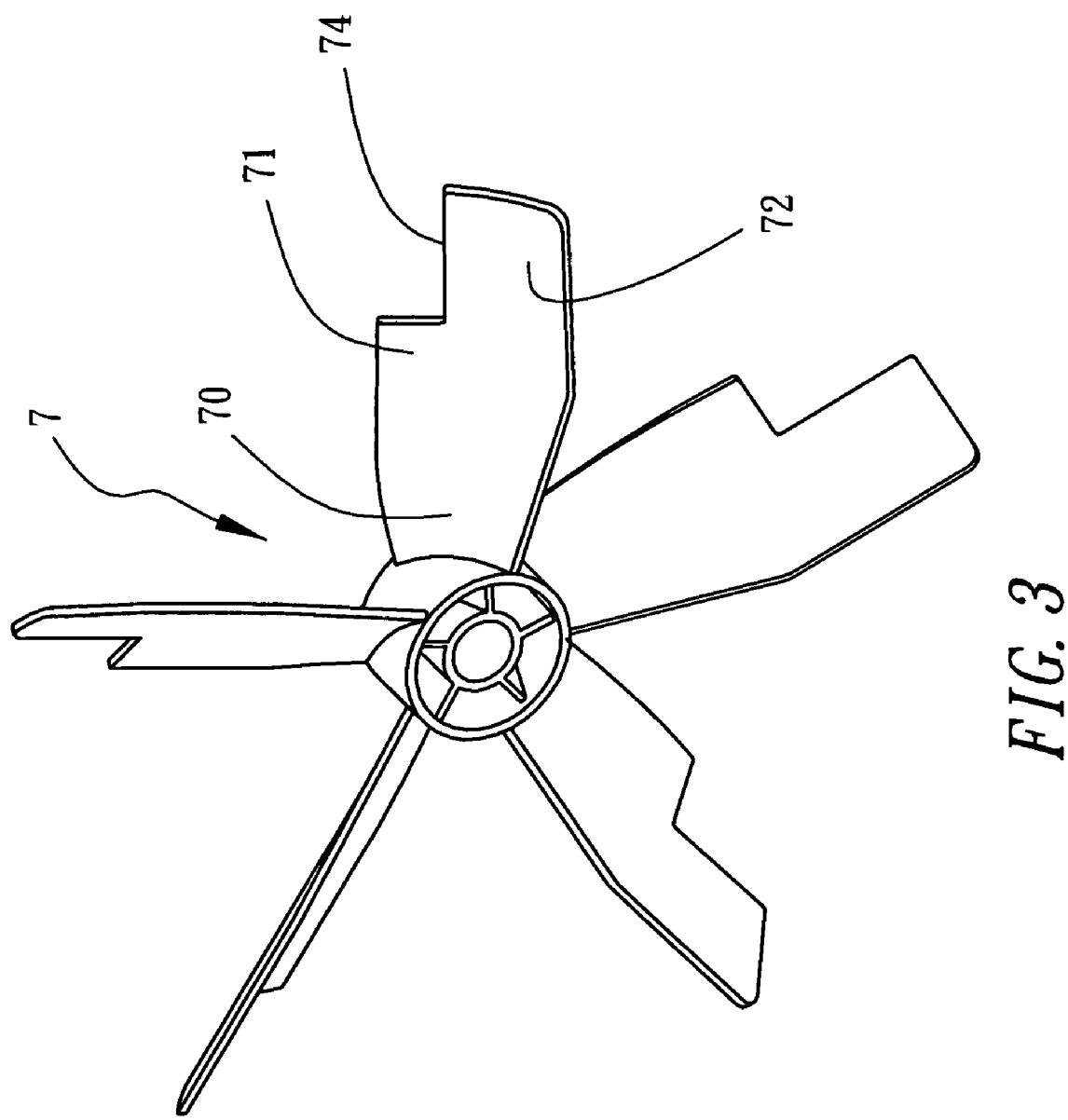
FIG. 3 is a perspective view of a cooling fan of the generator in accordance with the preferred embodiment of the present invention.
Figure 4:
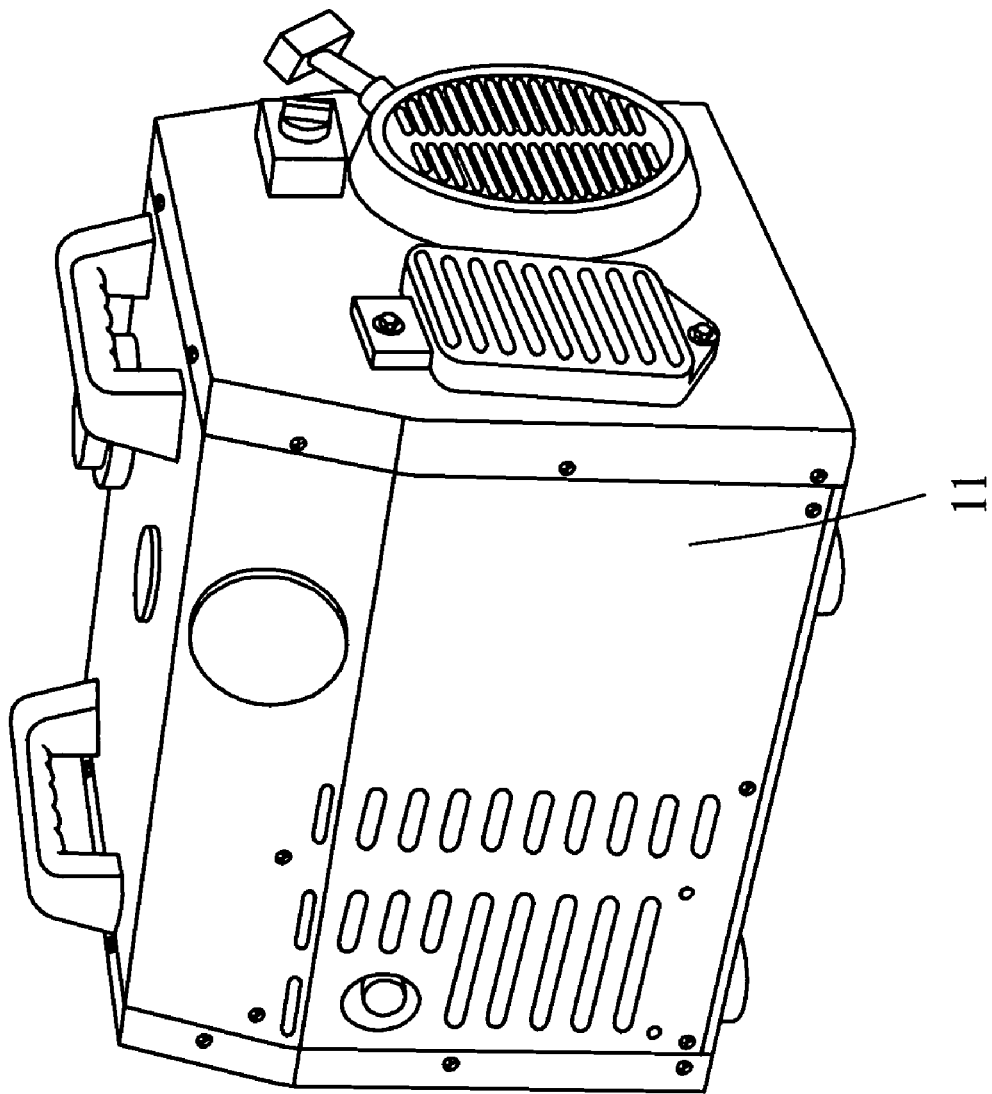
FIG. 4 is a perspective view of a conventional generator in accordance with the prior art.
Figure 5:
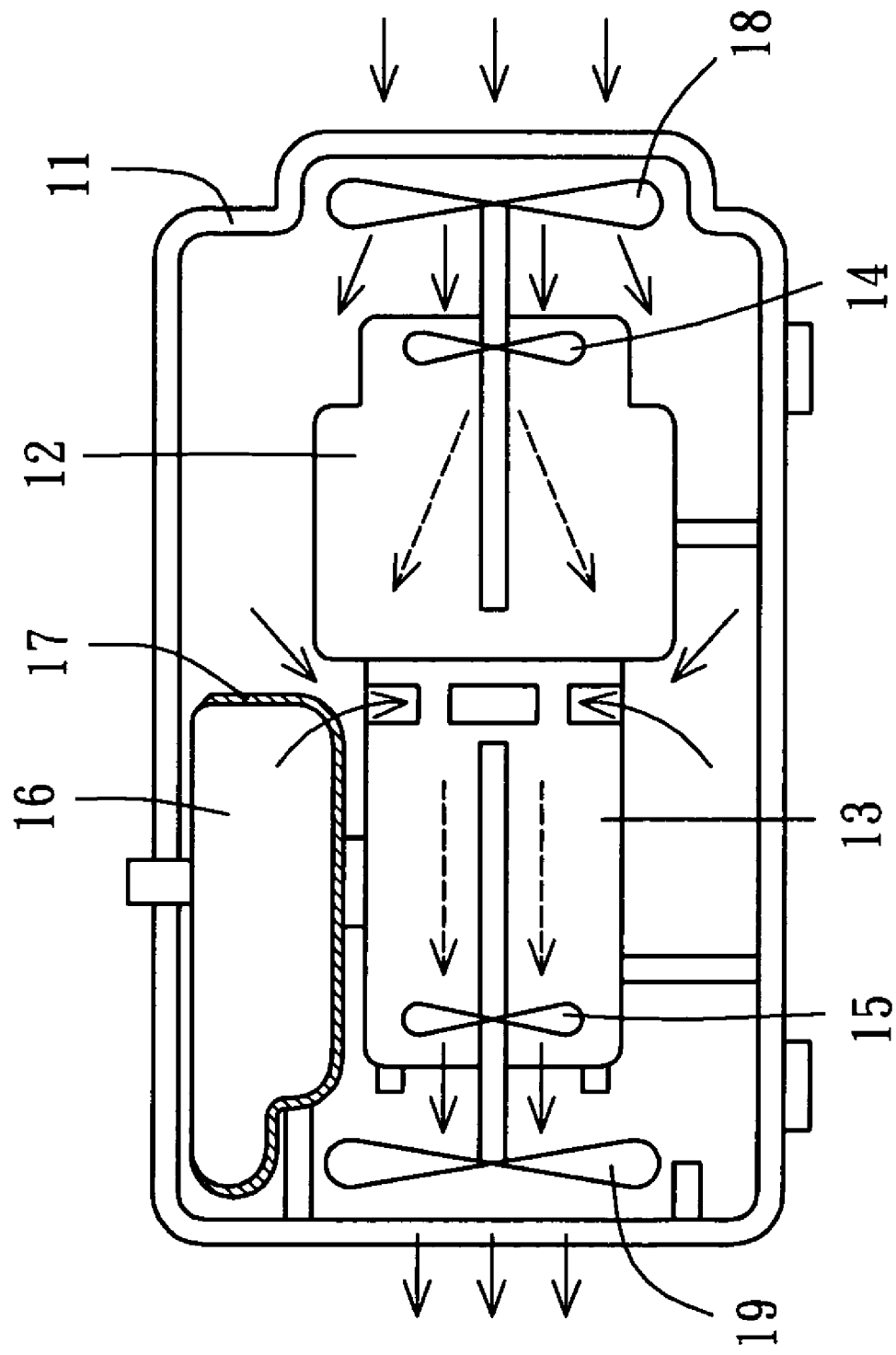
FIG. 5 is a front plan cross-sectional view of the conventional generator as shown in FIG. 4.

Referring to the drawings and initially to FIGS. 1 and 2, an air cooled type generator in accordance with the preferred embodiment of the present invention comprises a housing 2, an engine 3 mounted in the housing 2, a cooling fan 5 mounted in the engine 3, a generator body 4 mounted in the housing 2 and having a first side juxtaposed to the engine 3, a cooling fan 7 rotatably mounted on an opened second side of the generator body 4 and including a plurality of blades 70 each having an inner side formed with a first wing 71 located adjacent to the second side of the generator body 4 and an outer side formed with a second wing 72 spaced from the second side of the generator body 4, and a fuel tank 6 mounted in the housing 2.

The housing 2 has an outer side formed with a plurality of air inlets 21 as shown in FIG. 2. The first side of the generator body 4 is formed with a plurality of air intakes 41, and the second side of the generator body 4 is formed with an opening 42.

As shown in FIG. 3, the first wing 71 of each of the blades 70 of the cooling fan 7 has a length smaller than that of the second wing 72 so that each of the blades 70 of the cooling fan 7 has a breach 74 formed between the first wing 71 and the second wing 72. Each of the blades 70 of the cooling fan 7 is integrally formed with the first wing 71 and the second wing 72. In addition, each of the blades 70 of the cooling fan 7 has an arc-shaped concave oblique shape to form a wind shear oblique face to reduce the wind shear force applied on each of the blades 70 of the cooling fan 7.

As shown in FIG. 1, the first wing 71 of each of the blades 70 of the cooling fan 7 is received in the opening 42 of the generator body 4, and the second wing 72 of each of the blades 70 of the cooling fan 7 is protruded outward from the opening 42 of the generator body 4.

In operation, referring to FIGS. 1–3, when the cooling fan 7 is rotated, the air is introduced into the generator body 4 from the air intakes 41 to dissipate the heat produced by the generator body 4. Then, the first wing 71 of each of the blades 70 of the cooling fan 7 drains the hot air outwardly from the generator body 4. At the same time, the second wing 72 of each of the blades 70 of the cooling fan 7 further forces and accelerates the hot air to flow outwardly from the generator body 4 to enhance the heat dissipation effect. Thus, the first wing 71 and the second wing 72 of each of the blades 70 of the cooling fan 7 co-operate to carry the hot air away in a synchronous manner. In such a manner, the first wing 71 and the second wing 72 of each of the blades 70 of the cooling fan 7 co-operate to carry the hot air away from the generator body 4 rapidly, thereby enhancing the heat dissipation effect of the cooling fan 7.

Accordingly, the first wing 71 and the second wing 72 of each of the blades 70 of the cooling fan 7 co-operate to carry the hot air away from the generator body 4 rapidly, thereby enhancing the heat dissipation effect of the cooling fan 7. In addition, the generator only needs to provide two cooling fans 5 and 7 to achieve the heat dissipation effect, so that the generator has a simplified construction, thereby decreasing costs of fabrication. Further, the generator only has two cooling fans 5 and 7, so that the generator has a smaller volume, thereby facilitating storage, packaging and transportation of the generator. Further, the generator only has two cooling fans 5 and 7, so that the generator is assembled easily and conveniently, thereby facilitating a user mounting the generator. Further, the air inlets 21 of the housing 2 have changeable positions, and the air intakes 41 of the generator body 4 have changeable positions to distribute the air flow.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A generator, comprising:
    a housing;
    an engine mounted in the housing;
    a generator body mounted in the housing and having a first side juxtaposed to the engine;
    a cooling fan rotatably mounted on an opened second side of the generator body and including a plurality of blades each having an inner side formed with a first wing located adjacent to the second side of the generator body and an outer side formed with a second wing spaced from the second side of the generator body;
    wherein the housing has an outer side formed with a plurality of air inlets;
    wherein the air inlets of the housing have changeable positions.

2. The generator in accordance with claim 1, wherein the first wing of each of the blades of the cooling fan has a length smaller than that of the second wing.

3. The generator in accordance with claim 2, wherein each of the blades of the cooling fan has a breach formed between the first wing and the second wing.

4. The generator in accordance with claim 1, wherein each of the blades of the cooling fan is integrally formed with the first wing and the second wing.

5. The generator in accordance with claim 1, wherein each of the blades of the cooling fan has an arc-shaped concave oblique shape to form a wind shear oblique face.

6. The generator in accordance with claim 1, wherein the second side of the generator body is formed with an opening.

7. The generator in accordance with claim 6, wherein the first wing of each of the blades of the cooling fan is received in the opening of the generator body, and the second wing of each of the blades of the cooling fan is protruded outward from the opening of the generator body.

8. The generator in accordance with claim 1, wherein the first wing and the second wing of each of the blades of the cooling fan co-operate to carry air away from the generator body in a synchronous manner.

9. The generator in accordance with claim 1, wherein the first wing and the second wing of each of the blades of the cooling fan co-operate to carry the hot air away from the generator body rapidly, thereby enhancing the heat dissipation effect of the cooling fan.

10. A generator, comprising:
    a housing;
    an engine mounted in the housing;
    a generator body mounted in the housing and having a first side juxtaposed to the engine;
    a cooling fan rotatable mounted on an opened second side of the generator body and including a plurality of blades each having an inner side formed with a first wing located adjacent to the second side of the generator body and an outer side formed with a second wing spaced from the second side of the generator body;
    wherein the first side of the generator body is formed with a plurality of air intakes;
    wherein the air intakes of the generator body have changeable positions.

11. The generator in accordance with claim 1, further comprising a cooling fan mounted in the engine.

* * * * *